US 8,464,889 B1

(12) United States Patent
Keithley et al.

(10) Patent No.: US 8,464,889 B1
(45) Date of Patent: Jun. 18, 2013

(54) TRANSPORTABLE PASTRY CONTAINER

(76) Inventors: Lois Keithley, Rogersville, MO (US);
Darrin Keithley, Rogersville, MO (US)

( * ) Notice: Subject to any disclaimer, the term of this patent is extended or adjusted under 35 U.S.C. 154(b) by 312 days.

(21) Appl. No.: 12/897,478

(22) Filed: Oct. 4, 2010

(51) Int. Cl.
*B65D 45/02* (2006.01)
(52) U.S. Cl.
USPC ........ 220/512; 220/500; 220/23.83; 220/324; 220/326; 220/4.23; 206/372; 206/4.23; 206/501; 206/562; 206/589
(58) Field of Classification Search
USPC .. 220/500, 507, 509, 512, 520, 529; 206/372, 206/423, 501, 562, 589, 765; 426/115, 124
See application file for complete search history.

(56) References Cited

U.S. PATENT DOCUMENTS

| | | | | |
|---|---|---|---|---|
| 598,801 | A | * | 2/1898 | Minter .......................... 220/529 |
| 3,458,113 | A | * | 7/1969 | Swartzbaugh ................ 220/324 |
| 3,938,730 | A | | 2/1976 | Detzel et al. |
| 4,886,239 | A | * | 12/1989 | Stimmel ....................... 249/117 |
| 4,917,261 | A | * | 4/1990 | Borst ............................ 220/324 |
| 5,002,221 | A | | 3/1991 | Ragan |
| 5,353,946 | A | * | 10/1994 | Behrend ........................ 220/326 |
| 5,423,449 | A | | 6/1995 | Gordon et al. |
| 5,526,953 | A | * | 6/1996 | Chieng ........................ 220/4.23 |
| 5,542,206 | A | | 8/1996 | Lisch |
| 5,671,856 | A | | 9/1997 | Lisch |
| 5,699,925 | A | * | 12/1997 | Petruzzi ....................... 220/4.27 |
| 5,706,966 | A | | 1/1998 | Rothe |
| D393,422 | S | | 4/1998 | Pecher |
| 6,146,673 | A | * | 11/2000 | Ferguson ...................... 426/115 |
| 6,153,237 | A | | 11/2000 | Ferguson |
| 6,186,351 | B1 | * | 2/2001 | Coyle ......................... 220/23.83 |
| 6,279,744 | B1 | * | 8/2001 | Yu ................................. 206/372 |
| 6,296,120 | B1 | | 10/2001 | Danko |
| 2005/0023331 | A1 | | 2/2005 | Hirschey |
| 2008/0083639 | A1 | | 4/2008 | Peterman et al. |

OTHER PUBLICATIONS

Snap N' Stack Holiday Storage Box—4 Tier Toe by Snapware. http://www.amazon.com/Snap-Stack-Holiday-Storage-Box/dp/B000LQEFJK.

\* cited by examiner

*Primary Examiner* — Anthony Stashick
*Assistant Examiner* — Cynthia Collado
(74) *Attorney, Agent, or Firm* — Montgomery Patent & Design; Robert C. Montgomery

(57) ABSTRACT

A transportable pastry container comprises a modular system of portable containers which comprises a lid portion and a storage portion. The lid portion comprises a flat, rectangular lid with a handle located centrally on a top surface. The storage portion comprises a rectangular bottom surface of as well as integral side walls which extend perpendicularly upward from the sides of the bottom surface. The top edges of the side walls further comprise a plurality of fasteners which extend above the top of the walls. The bottom edges of the side walls and the sides of the lid portion are further comprised of corresponding fasteners which selectively attach or detach the lid portion to the top of a storage portion. In a preferred embodiment, one (1) side wall of each storage portion further comprises a hinged door for selective accessibility.

9 Claims, 6 Drawing Sheets

TRANSPORTABLE PASTRY CONTAINER

RELATED APPLICATIONS

The present invention was first described in a notarized Official Record of Invention on Sep. 29, 2009, that is on file at the offices of Montgomery Patent and Design, LLC, the entire disclosures of which are incorporated herein by reference.

FIELD OF THE INVENTION

The present invention relates generally to storage containers, and in particular, to a modular portable container particularly adapted for the carrying and display of foodstuffs.

BACKGROUND OF THE INVENTION

Baked goods are some of the most commonly consumed foods in the world. The wide range of available baked goods including pastries, donuts, cupcakes, and bagels makes them suitable for a range of events. Furthermore, these goods are often purchased in bulk due to their cheap cost, batch production, and small serving sizes. These features also make them ideal as supplementary items for many meals and events. Most of these goods are purchased at a bakery where they are packaged in a large cardboard box for transportation back to home.

While such boxes are convenient for transport of such goods, there are several problems associated with such methods. First, the boxes are generally flimsy and are prone to easily being crushed or falling apart, resulting to damage or ruining of the contained goods. Additionally, such boxes often allow the enclosed baked goods to become stale in a short amount of time. Additionally, such boxes are often discarded after use, resulting in an increase in waste materials.

Various attempts have been made to provide baked goods storage and transport containers. Examples of these attempts can be seen by reference to several U.S. patents. U.S. Pat. No. 5,706,966, issued in the name of Rothe, describes a multiple tier dessert container with a plurality of side accessible tray portions.

U.S. Pat. No. 6,153,237, issued in the name of Ferguson, describes a baked goods container with a plurality of removable inserts for the transport of cupcakes and the like.

U.S. Pat. No. 6,296,120, issued in the name of Danko, describes a pastry box assembly which is capable of containing a plurality of retaining trays.

Additionally, ornamental designs for a donut box exist, particularly U.S. Pat. Nos. D 393,422. However, none of these designs are similar to the present invention.

While these devices fulfill their respective, particular objectives, each of these references suffer from one (1) or more of the aforementioned disadvantages. Many such devices do not facilitate quick access to the entire volume of contained objects. Also, many such devices do not provide sufficient features of protection and preservation as desirable for fresh baked goods. Furthermore, many such devices are not adapted to store a wide variety of shapes and sizes of baked goods. In addition, many such devices do not facilitate transport by a single user in a manner which sufficiently prevents damage to contained goods. Accordingly, there exists a need for a transportable pastry container without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a transportable pastry and baked goods container capable of containing a variety of goods in an organized manner which facilitates transport and use by a single user in a manner which provides sufficient protection to the contained goods. Thus, the object of the present invention is to solve the aforementioned disadvantages and provide for this need.

To achieve the above objectives, it is an object of the present invention to provide a means for storage and transport of foodstuffs, particularly baked goods. The apparatus comprises a container, a lid, and a divider.

Another object of the present invention is to provide a washable, reusable container for regular use.

Yet still another object of the present invention is to allow a user to retain and separate layers of pastries in a tiered manner via the divider. The divider comprises a flat plastic insert which sits upon an interior perimeter ledge portion of the container.

Yet still another object of the present invention is to facilitate removal of the divider via a pair of finger reliefs located along opposing lateral edges of the divider.

Yet still another object of the present invention is to comprise the divider of a honey-comb pattern which provides an aesthetic function while facilitating removal of the divider and separation of sticky baked goods from the divider.

Yet still another object of the present invention is to seal the contents of the container in an airtight manner via a lid hingedly connected to the container. In particular, this provides a means to preserve freshly baked goods.

Yet still another object of the present invention is to allow a user to secure the apparatus in a closed, sealed state via a pair of latching locking means located along corresponding edge portions of the lid and container. The locking means further provide secure engagement of the lid to the container, allowing a user to grasp and transport the apparatus via a handle portion of the lid. A user may disengage the locking means in order to access the interior of the container via a pulling and lifting motion.

Yet still another object of the present invention is to provide a method of utilizing the device that provides a unique means of acquiring an instance of the apparatus, lifting the locking means to unlatch the lid, opening the lid to access the interior of the container, removing the divider via the finger reliefs, filling the lower portion of the container with a desired plurality of foodstuffs, replacing the divider on the ledge, filling the upper portion of the container with a desired plurality of foodstuffs separate from the lower portion, locking the lid to provide a securing and sealing means to the container, transporting the apparatus via the handle portion, selectively removing any of the desired plurality of stored items via opening of the lid and removal of the divider as necessary, and washing the apparatus after use in preparation for subsequent reuse.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | transportable pastry container |
| 20 | container |
| 21 | container front panel |
| 22 | container side panel |
| 23 | container rear panel |
| 24 | container bottom panel |
| 25 | container interlocking feature |
| 26 | divider |
| 27 | finger relief |
| 28a | notch |
| 28b | protrusion |
| 29a | ledge |
| 29b | detent |
| 29c | container lip |
| 30 | lid |
| 31 | lid front panel |
| 32 | lid side panel |
| 33 | lid rear panel |
| 34 | lid top panel |
| 35 | lid interlocking feature |
| 36a | locking means |
| 36b | gripping means |
| 37 | locking lip |
| 38 | supporting member |
| 40 | handle |
| 41 | handle attachment means |
| 50 | hinge |
| 51 | container connection |
| 52 | lid connection |
| 60 | finger |

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
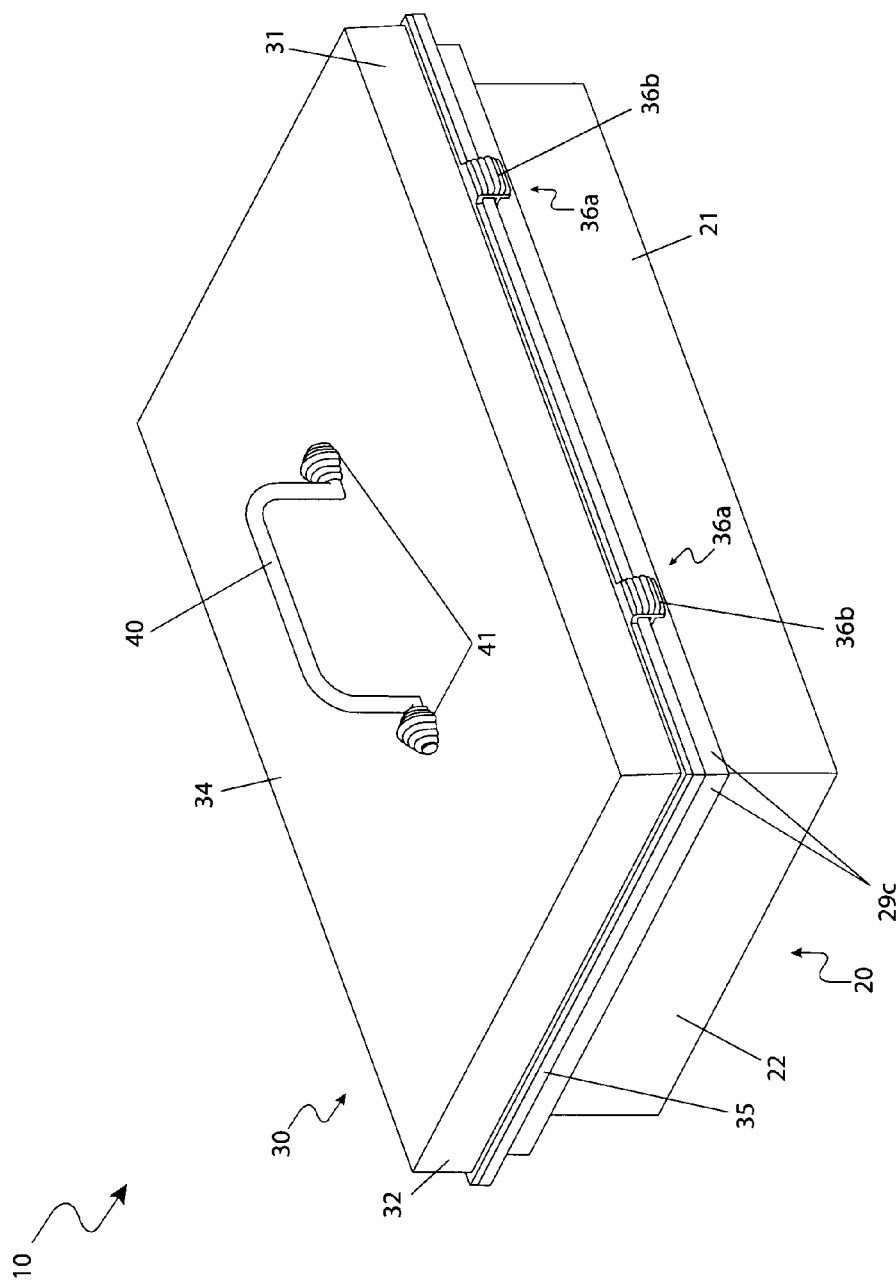
FIG. 1 is a perspective view of a transportable pastry container 10 depicting a closed state, according to a preferred embodiment of the present invention.

The present invention describes a transportable pastry container (herein described as the "apparatus") 10, which provides a means for storing of foodstuffs, particularly suited for baked goods such as, donuts, cupcakes, bagels, or other similar pastries. Referring now to FIG. 1, a perspective view of the apparatus 10 depicting a closed state, according to the preferred embodiment of the present invention, is disclosed. The apparatus 10 provides a user with an airtight, durable, and reusable container which provides a means to retain the freshness of the pastries, protect the pastries during transporting to a desired location for serving, and is environmental friendly, respectively. The apparatus 10 is preferably fabricated from a durable opaque plastic, yet other materials may be utilized without limiting the scope of said apparatus 10. The apparatus 10 may also comprise indicia which may provide script or logos based upon the user's preference and may include images such as, but not limited to: sports names/logos, personal names, symbols, pictures, and the like to further customize and personalize the apparatus 10 further comprising a variety of colors and patterns. The apparatus 10 further comprises dimensions measuring approximately five (5) inches in height by eight (8) inches in width by twelve (12) inches in length.

Figure 2:
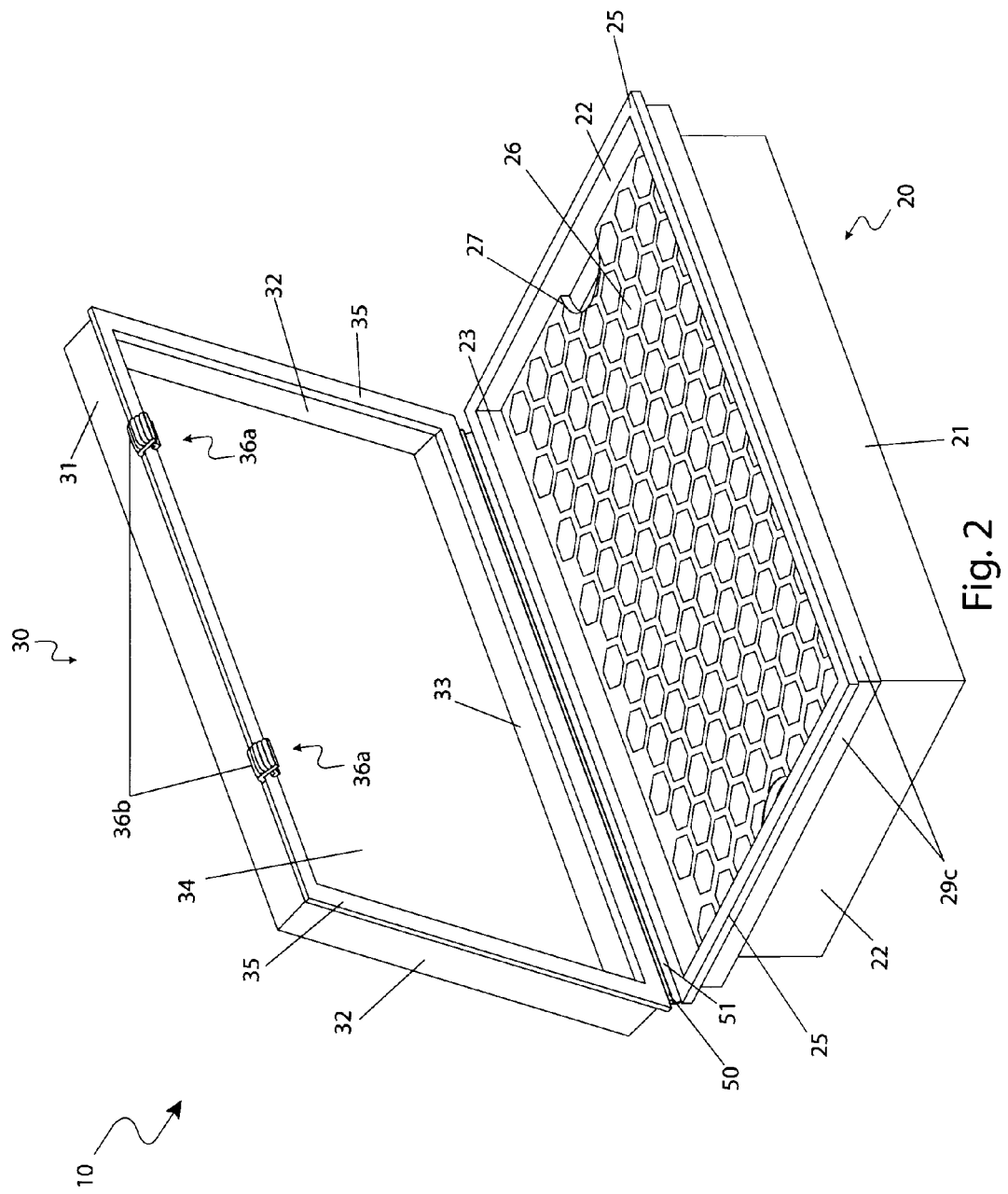
FIG. 2 is another perspective view of the transportable pastry container 10 depicting an open state, according to a preferred embodiment of the present invention.

Referring now to FIG. 2, a perspective view of the apparatus 10 depicting an open state, according to the preferred embodiment of the present invention, is disclosed. The apparatus 10 comprises a container 20, a lid 30, and other associated enhanced features. The container 20 comprises expected features such as a front panel 21, a pair of side panels 22, a rear panel 23, a bottom panel 24, and an open upper surface which provides a means to secure and place desired pastries within said container 20. Each container panel 21, 22, 23, 24 is preferably integrally molded via conventional plastic welding or extruding techniques. The container 20 also provides a securing means to a divider 26 (also see FIG. 3) which enables said container 20 to retain and separate layers of pastries in a tiered manner.

Hingedly attached to an upper perimeter surface of the container 20 is the lid 30 which provides a means to seal-off the contents of the container in a preferably airtight manner. The lid 30 comprises expected features such as a lid front panel 31, a pair of lid side panels 32, a lid rear panel 33, a lid top panel 34, and an open rear surface which provides a means to engage said lid 30 to the container 20. The lid 30 also comprises a pair of locking means 36a (also see FIGS. 6 and 7) to secure the apparatus 10 in a close state (see FIG. 1) and a handle 40 (see FIG. 5) which provides a grasping means for transporting said apparatus 10 to a desired location.

Figure 3:
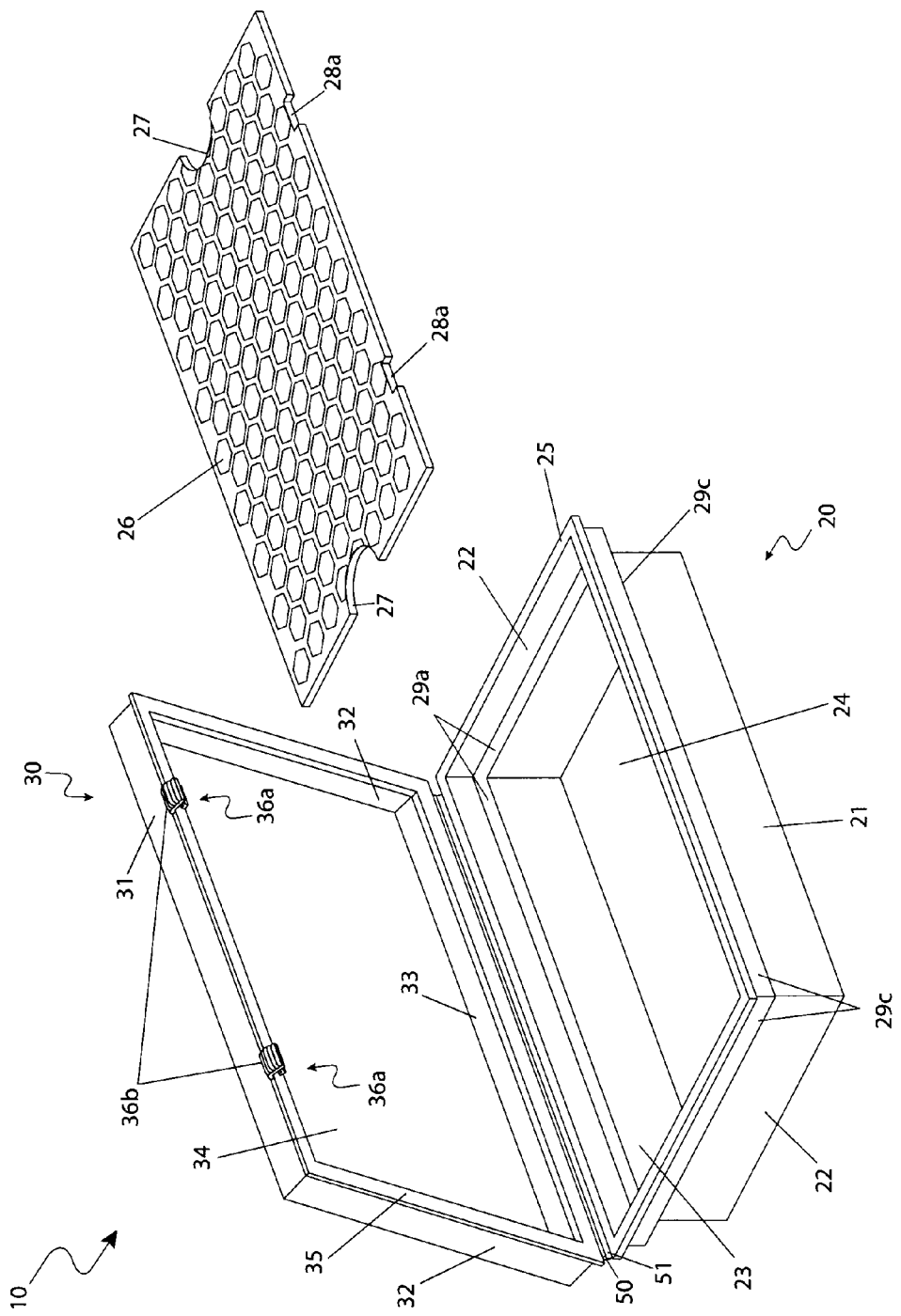
FIG. 3 is an exploded perspective view of the transportable pastry container 10 depicting an open state, according to a preferred embodiment of the present invention.
Figure 4:
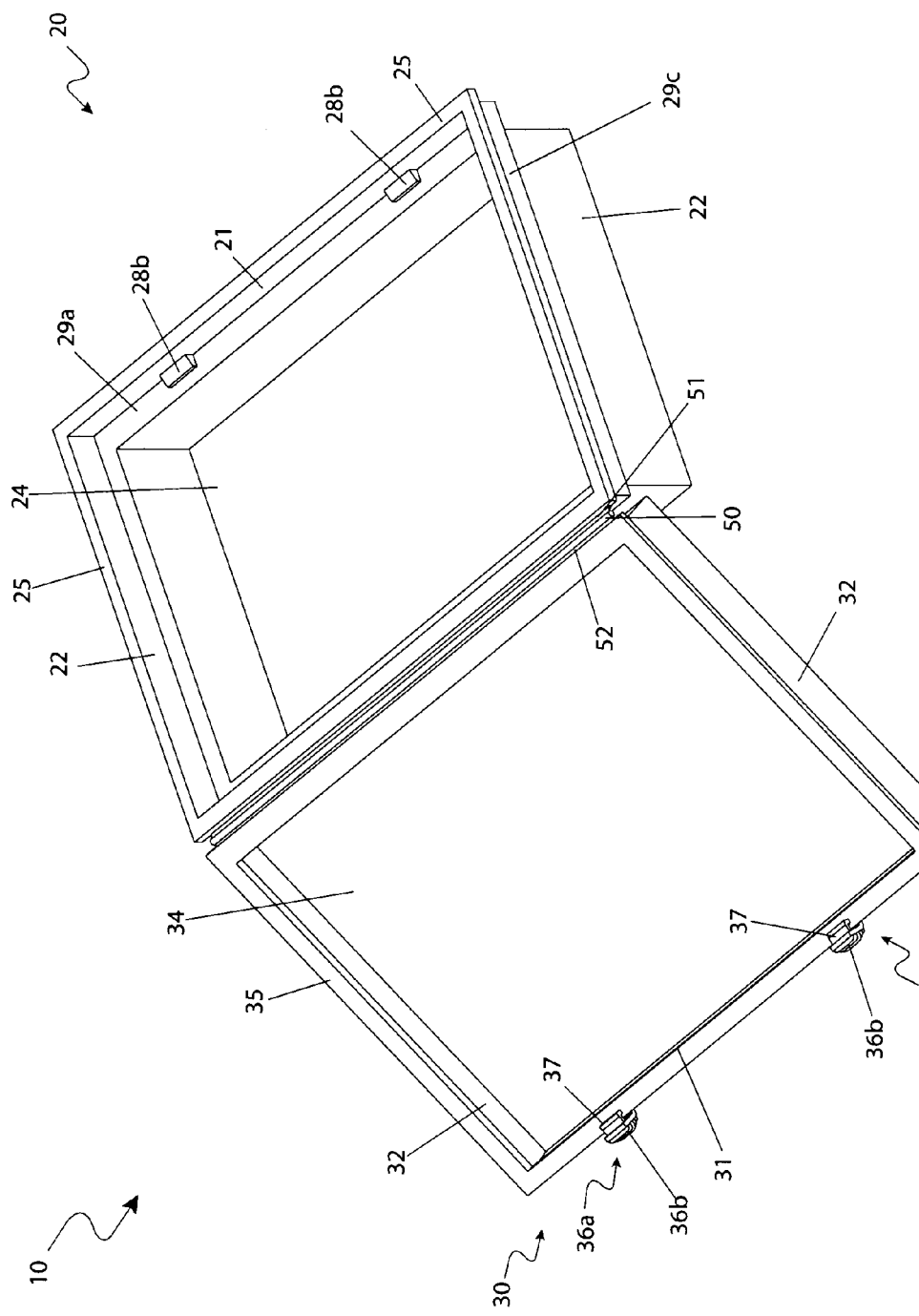
FIG. 4 is another perspective view of the transportable pastry container 10 depicting a removed divider 26, according to a preferred embodiment of the present invention.

Referring now to FIG. 3, an exploded perspective view of the apparatus 10 depicting an open state and FIG. 4, another perspective view of the transportable pastry container 10 depicting a removed divider 26, according to the preferred embodiment of the present invention, are disclosed. The lid 30 secures to the container 20 via engaging a container interlocking feature 25 to a lid interlocking feature 35 which provides an airtight seal to the contents within the apparatus 10 in a common manner. The container interlocking feature 25 is located along the upper perimeter edges of the container front panel 21, the container side panels 22, container rear panel 23 and the lid interlocking feature 35 is located along the upper perimeter edges of the lid front panel 31, the lid side panels 32, and lid rear panel 33. The lid 30 further secures to the container 20 via a pair of locking means 36a engaging a pair of corresponding apertures 29c (see FIGS. 6 and 7).

The apparatus 10 also comprises a divider 26 as abovementioned which provides a means to separate contents within the container 20. The divider 26 enables desired pastries to be placed upon the container bottom panel 24 and upon said divider 26. The divider 26 comprises dimensions slightly smaller than the container 20 to enable placement within. The divider 26 preferably comprises a transparent honeycomb-shaped inlay which provides an aesthetically pleasing and unique feature to the apparatus 10. The divider 26 also comprises a pair of finger reliefs 27 and a pair of notches 28a. The finger reliefs 27 comprise a "U"-shaped cut-out along opposing lateral edges of the divider 26. The finger reliefs 27 enable the user to conveniently remove or place the divider 26 into the container 20. The divider 26 is suspended onto the container 20 via a ledge 29a which protrudes from an intermediate interior surface of the container front panel 21, the container side panels 22, and container rear panel 23. The ledge 29a enables the divider 26 to be set upon superjacently in a secure position. The notches 28a are located along a front longitudinal surface and are utilized to correspond to a pair of protrusions 28b located on the ledge 29a along the container front panel 21. The protrusions 28b are utilized to structurally support the container front panel 21 during attachment of the locking means 36a (see FIGS. 6 and 7).

Figure 5:
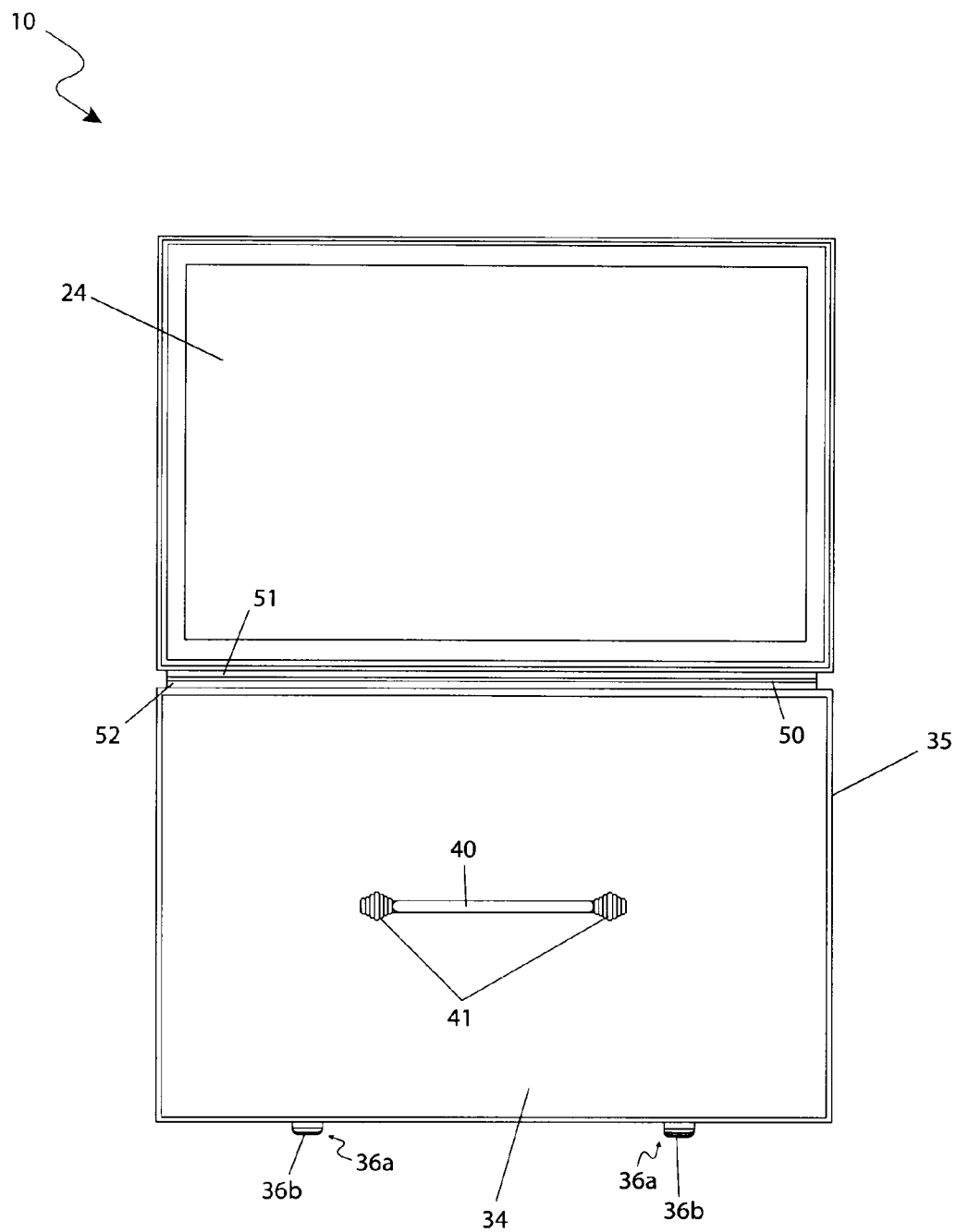
FIG. 5 is a top view of the transportable pastry container 10 depicting a container bottom panel 24 being rotated and coplanar with respect to a lid 30, according to a preferred embodiment of the present invention.

Referring now to FIG. 5, a top view of the transportable pastry container 10 depicting a container bottom panel 24 being rotated and coplanar with respect to a lid 30, according to the preferred embodiment of the present invention, is disclosed. Illustrated herein is the attachment means and hinging means of the container 20 to the lid 30. An upper perimeter edge of the container rear panel 23 comprises a container connection 51 and a lower perimeter edge of the lid rear panel 33 comprises a lid connection 52. Each connection 51, 52 is preferable integrally molded into the container 20 or lid 30, respectively, and provides additional connection to the hinge 50. The hinge 50 enables the lid 30 to rotate up to one-hundred-and-eighty degrees (180°) from the container 20, thereby enabling the apparatus 10 to be positioned in an open or closed state.

An upper surface of the lid top panel 34 comprises a handle 40 which provides a grasping means to the apparatus 10 for transportation purposes. The handle 40 comprises an arcuate ergonomic form and is rotatably attached to the lid 30 via a pair of opposing handle attachment means 41. The handle attachment means 41 comprise a beehive-shape for illustration purposes only; it is known that other shapes, pattern, or the like may be utilized without limiting the scope of the apparatus 10.

Figure 6:
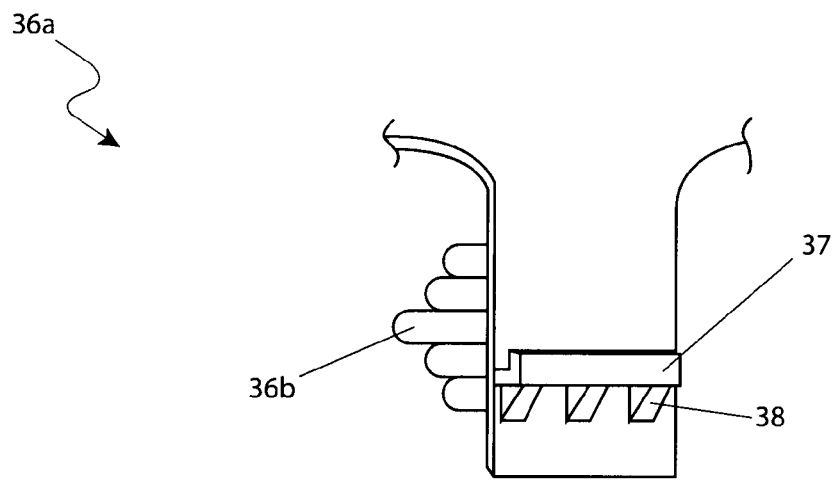
FIG. 6 is a rear view of a locking means 36a, according to a preferred embodiment of the present invention; and, FIG. 7 is a side view of the locking means 36a depicting attachment to a container 20, according to a preferred embodiment of the present invention.
Figure 7:
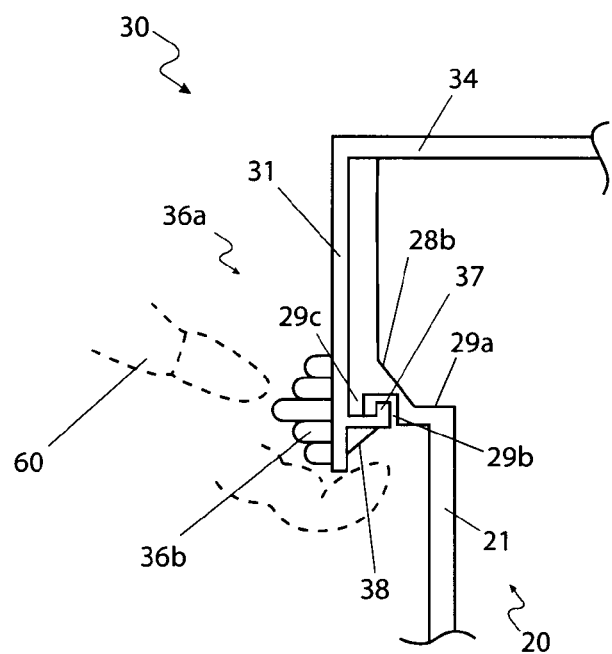

Referring now to FIG. 6, a rear view of a locking means 36a and FIG. 7, a side view of the locking means 36a depicting attachment to a container 20, according to the preferred embodiment of the present invention, are disclosed. As abovementioned the apparatus 10 further comprises a locking means 36a which provides a feature to secure the lid 30 in a closed position onto the container 20. The locking means 36a comprises a gripping means 36b, a locking lip 37, and a plurality of supporting structures 38. The locking means 36a is integrally molded and extends from the lid front panel 31. The gripping means 36b provides a structure for the user to position a finger 60 upon for latching and unlatching of the locking means 36a onto the container 20. The gripping means 36b is depicted herein as comprising a beehive-shape for illustration purposes it is known that other shapes and patterns may be utilized without limiting the scope of the apparatus 10. A rear surface of the gripping means 36b comprises the locking lip 37. The locking lip 37 comprises an "L"-shaped member which extends from said gripping means 36b in a perpendicular orientation. The locking lip 37 is structurally supported via a plurality of triangular integrally molded supporting members 38. The supporting members 38 are located along an underside of the lock lip 37. The locking lip 37 engages a detent 29b to secure the lid 30 to the container 20. The detent 29b is located on an underside of a container lip 29c. The container lip 29c is located on an exterior intermediate surface of the container front panel 21 and the container side panels 22 (see FIG. 1). The locking lip 37 latches upwardly into the detent 29b, thereby securing the locking means 36 to the container 20. The user may utilize a pair of fingers 60 to remove the locking means 36 from the container 20 via applying a forward and upward force to the rear surface of said locking means 36.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 3.

The method of installing and utilizing the apparatus 10 may be achieved by performing the following steps: acquiring the apparatus 10; positioning the container 20 on a level surface with the container bottom panel 24 parallel with said surface; lifting the locking means 36a to unlatch the locking lip 37 from the detent 29b via grasping the gripping means 36b; rotating the lid 30 away from the container 20 via the hinge 50; filling the container 20 with a desired contents; inserting the divider 26 onto the ledge 29a as desired via utilizing the finger reliefs 27 to position the divider 26 and mating the notches 28a with each protrusion 28b; positioning desired contents onto said divider 26; closing the lid 30 onto the container 20 via engaging the container interlocking feature 25 with the lid interlocking feature 35; latching the locking means 36a via grasping the gripping means 36b and engaging the locking lip 37 into the detent 29b; grasping the handle 40 to transport the apparatus 10 to a desired location; and, utilizing the apparatus 10 to provide a better way of purchasing and transporting baked goods in a manner which is not only environmentally responsible, but provides for better tasting products as well.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A transportable pastry container adapted for storing and protecting pastries during transport, said transportable pastry container comprising:
   a container, comprising:
      a front panel, a plurality of side panels, a rear panel, a bottom panel and an open upper surface;
      a container interlocking feature located along upper perimeter edges of said container front panel, said container side panels and said container rear panel respectively;
      a ledge protruding from an intermediate interior surface of said container front panel, said container side panels, and said container rear panel respectively;
      a plurality of protrusions located on said ledge along said container front panel; and,
      a container lip located on an exterior intermediate surface of said container front panel and said container side panels respectively;
   a lid hingedly attached to said container;
   a divider positioned in said container to sit superjacently on said ledge; and,
   a plurality of locking mechanisms attaching said lid to said container in an airtight condition;
   wherein said plurality of locking mechanisms extend from said lid and each comprises:
      a gripping mechanism;
      an L-shaped locking lip extending in a perpendicular orientation from said gripping mechanism;
      a supporting structure located along an underside of said locking lip; and,
      a detent located on an underside of said container lip.

2. The transportable pastry container of claim 1, wherein said lid comprises:
   a lid front panel, a plurality of lid side panels, a lid rear panel, a lid top panel and an open rear surface selectively engaging said lid to said container;
   a plurality of handle attachment mechanisms;
   a handle rotatably attached to said lid via said handle attachment mechanisms; and,
   a lid interlocking feature located along upper perimeter edges of said lid front panel, said lid side panels, and said lid rear panel respectively;
   wherein said lid is secured to said container when said container interlocking feature is engaged to said lid interlocking feature.

3. The transportable pastry container of claim 2, wherein said divider has a transparent honeycomb-shaped inlay and comprises:
   a plurality of finger reliefs having a U-shaped cut-out situated along opposing lateral edges of said divider; and,
   a plurality of notches located along a front longitudinal surface of said divider;
   wherein said notches are correspondingly aligned with said protrusions of said ledge; and,
   wherein said divider is supported in said container via said ledge.

4. The transportable pastry container of claim 1, wherein said locking lip engages said detent and latches upwardly into said detent when said lid is secured to said container.

5. A transportable pastry container adapted for storing and protecting pastries during transport, said transportable pastry container comprising:
   a container, comprising:
      a front panel, a plurality of side panels, a rear panel, a bottom panel and an open upper surface;
      a container interlocking feature located along upper perimeter edges of said container front panel, said container side panels and said container rear panel respectively;
      a ledge protruding from an intermediate interior surface of said container front panel, said container side panels, and said container rear panel respectively;
      a plurality of protrusions located on said ledge along said container front panel; and
      a container lip located on an exterior intermediate surface of said container front panel and said container side panels respectively;
   a lid hingedly attached to said container;
   a divider removably positioned in said container to sit superjacently on said ledge; and,
   a plurality of locking mechanisms selectively attaching said lid to said container in an airtight condition;
   wherein said locking mechanism extends from said lid and each comprises:
      a gripping mechanism;
      an L-shaped locking lip extending in a perpendicular orientation from said gripping mechanism;
      a supporting structure located along an underside of said locking lip; and,
      a detent located on an underside of said container lip.

6. The transportable pastry container of claim 5, wherein said lid comprises:
   a lid front panel, a plurality of lid side panels, a lid rear panel, a lid top panel and an open rear surface selectively engaging said lid to said container;
   a plurality of handle attachment mechanisms;
   a handle rotatably attached to said lid via said handle attachment mechanisms; and,
   a lid interlocking feature located along upper perimeter edges of said lid front panel, said lid side panels, and said lid rear panel respectively;
   wherein said lid is secured to said container when said container interlocking feature is engaged to said lid interlocking feature.

7. The transportable pastry container of claim 6, wherein said divider has a transparent honeycomb-shaped inlay and comprises:
   a plurality of finger reliefs having a U-shaped cut-out situated along opposing lateral edges of said divider; and,
   a plurality of notches located along a front longitudinal surface of said divider;
   wherein said notches are correspondingly aligned with said protrusions of said ledge; and,
   wherein said divider is supported in said container via said ledge.

8. The transportable pastry container of claim 5, wherein said locking lip engages said detent and latches upwardly into said detent when said lid is secured to said container.

9. A method of utilizing a transportable pastry container for storing and protecting pastries during transport, said method comprising the step of:
   providing a container, comprising a front panel, a plurality of side panels, a rear panel, a bottom panel and an open upper surface, a container interlocking feature located along upper perimeter edges of said container front panel, said container side panels and said container rear panel respectively, a ledge protruding from an intermediate interior surface of said container front panel, said container side panels, and said container rear panel respectively, a plurality of protrusions located on said ledge along said container front panel, and a container lip located on an exterior intermediate surface of said container front panel and said container side panels respectively;

providing and hingedly attaching a lid to said container;

providing and removably positioning a divider in said container;

providing a plurality of locking mechanisms, each comprising a gripping mechanism, an L-shaped locking lip extending in a perpendicular orientation from said gripping mechanism, a supporting structure located along an underside of said locking lip, and a detent located on an underside of said container lip; and, said locking mechanisms selectively attaching said lid to said container in an airtight condition.

* * * * *